(12) United States Patent
Monson

(10) Patent No.: US 6,782,597 B1
(45) Date of Patent: Aug. 31, 2004

(54) METHOD FOR MOUNTING A BOLT ON A SURFACE

(76) Inventor: Brant Monson, 3875 N. Cove Dr., Provo, UT (US) 84604

(*) Notice: Subject to any disclaimer, the term of this patent is extended or adjusted under 35 U.S.C. 154(b) by 240 days.

(21) Appl. No.: 10/071,421

(22) Filed: Feb. 8, 2002

Related U.S. Application Data

(63) Continuation-in-part of application No. 09/771,119, filed on Jan. 26, 2001.

(51) Int. Cl.[7] .............................. B23P 11/00; F16B 23/00
(52) U.S. Cl. .................. 29/456; 29/525.02; 29/525.11; 411/402
(58) Field of Search ................................ 411/378, 402, 411/403, 395, 405, 407; 29/456, 525.02, 525.11; D8/387

(56) References Cited

U.S. PATENT DOCUMENTS

| | | | |
|---|---|---|---|
| 66,234 A | | 7/1867 | Grilley |
| 74,692 A | | 2/1868 | Ives |
| 231,613 A | | 8/1880 | Richards |
| 258,061 A | * | 5/1882 | Haviland ............... 256/53 |
| 316,619 A | | 4/1885 | Hayes |
| 389,203 A | * | 9/1888 | Crane ..................... 7/102 |
| 429,057 A | * | 5/1890 | Peterson ................ 248/62 |
| 610,423 A | * | 9/1898 | Van Ommeren ....... 411/405 |
| 662,134 A | * | 11/1900 | Rodd ..................... 411/405 |
| 755,804 A | | 3/1904 | Smith |
| 803,840 A | * | 11/1905 | Miller .................... 279/97 |
| 1,096,701 A | * | 5/1914 | Emsley .................. 404/25 |
| 1,243,799 A | | 10/1917 | Bissell |
| 1,312,409 A | | 8/1919 | Miller et al. |
| 1,330,098 A | * | 2/1920 | Smith .................... 411/405 |
| 1,498,360 A | * | 6/1924 | Douglas ................ 439/672 |
| 1,715,032 A | * | 5/1929 | Hoegger ............... 312/242 |
| 1,857,388 A | * | 5/1932 | Linderman et al. ....... 411/378 |
| 1,868,415 A | | 7/1932 | Gundersen et al. |
| 2,036,875 A | * | 4/1936 | Kraft ..................... 215/360 |
| 2,064,342 A | | 12/1936 | England |
| 2,076,041 A | | 4/1937 | Payne |
| 2,095,397 A | * | 10/1937 | Overmyer ............... 16/414 |
| 2,120,061 A | | 6/1938 | Blakeslee |
| 2,126,026 A | | 8/1938 | Munson |
| 2,180,633 A | * | 11/1939 | Holt ...................... 411/405 |
| 2,227,084 A | | 12/1940 | Hassig |
| 2,451,747 A | * | 10/1948 | Kindt ..................... 164/249 |
| 2,640,734 A | | 6/1953 | Meng |
| 2,660,083 A | * | 11/1953 | Tyson .................... 411/396 |
| 2,752,814 A | | 7/1956 | Iaia |
| 2,951,274 A | * | 9/1960 | Elsner .................... 24/635 |
| 3,079,968 A | | 3/1963 | Buckley |
| 3,095,222 A | * | 6/1963 | Davies et al. ........... 403/236 |
| 3,244,057 A | | 4/1966 | Mathison |
| D207,123 S | | 3/1967 | Flood |
| 3,337,925 A | | 8/1967 | Meyer |
| D218,226 S | | 8/1970 | Painaud |
| 4,006,660 A | * | 2/1977 | Yamamoto et al. ......... 411/405 |
| 4,018,111 A | * | 4/1977 | Goldhaber ............... 81/436 |
| D248,014 S | * | 5/1978 | DeCaro ................... D8/387 |
| 4,091,708 A | * | 5/1978 | Jacobson ................ 411/407 |
| 4,121,495 A | | 10/1978 | Malo et al. |
| 4,124,317 A | | 11/1978 | Dauth |
| 4,295,765 A | * | 10/1981 | Burke .................... 410/101 |
| 4,484,849 A | | 11/1984 | Klimowicz |
| 4,504,180 A | * | 3/1985 | Ishii et al. ................ 411/5 |
| 4,516,893 A | | 5/1985 | Barth |
| 4,539,874 A | * | 9/1985 | Jacovitz ................... 81/454 |
| 4,540,322 A | * | 9/1985 | Coffia ..................... 411/338 |
| D283,301 S | | 4/1986 | Spitz |
| 4,659,267 A | | 4/1987 | Uno et al. |

(List continued on next page.)

Primary Examiner—David P. Bryant
(74) Attorney, Agent, or Firm—Randall B. Bateman

(57) ABSTRACT

A bolt for use in for mounting a backrest to a motorcycle or otherwise for attachment to a surface includes a shank, and head, and a transverse recess transverse to the longitudinal axis of the shank for holding the head while a nut is being tightened on the bolt.

18 Claims, 12 Drawing Sheets

U.S. PATENT DOCUMENTS

| | | | |
|---|---|---|---|
| 4,749,319 A | | 6/1988 | Sygnator |
| 4,848,405 A | | 7/1989 | Albrecht |
| D303,494 S | | 9/1989 | Lange |
| 4,911,593 A | * | 3/1990 | Kephart ................ 411/403 |
| 4,993,731 A | | 2/1991 | Fuller |
| 5,044,855 A | | 9/1991 | Fukubayashi |
| 5,156,509 A | | 10/1992 | Wu |
| D335,465 S | | 5/1993 | Garrison, III |
| 5,214,987 A | | 6/1993 | Fenton, Sr. |
| 5,549,677 A | | 8/1996 | Durr et al. |
| 5,580,199 A | | 12/1996 | Suzuki |
| 5,647,253 A | * | 7/1997 | Pozek .................... 81/125 |
| 5,667,232 A | | 9/1997 | Gogan et al. |
| 5,762,457 A | * | 6/1998 | Lide ....................... 411/405 |
| 5,795,120 A | | 8/1998 | Hurdle |
| 5,833,419 A | * | 11/1998 | Franciskovich et al. .... 411/403 |
| 5,913,650 A | | 6/1999 | Daoud |
| 5,919,020 A | | 7/1999 | Walther |
| D418,048 S | | 12/1999 | Chan |
| 6,042,314 A | | 3/2000 | Guelck |
| D422,202 S | | 4/2000 | Maki |
| 6,045,312 A | | 4/2000 | Hsing |
| 6,317,936 B1 | | 11/2001 | McDaid et al. |
| 6,318,924 B1 | | 11/2001 | Schiavo, Jr. |
| 6,321,623 B1 | | 11/2001 | Dykes et al. |
| 6,343,808 B1 | | 2/2002 | Luh |

\* cited by examiner

METHOD FOR MOUNTING A BOLT ON A SURFACE

RELATED APPLICATIONS

The present invention is a continuation-in-part of U.S. patent application Ser. No. 09/771,119, filed Jan. 26, 2001, and also is related to U.S. Design patent application Nos. 29/151,180; 29/151,161, now U.S. Pat. No. D469,006, and 29/153,351, now D466,908, all filed Oct. 19, 2001, and U.S. patent application Ser. No. 10/035,599, filed Oct. 19, 2001.

BACKGROUND OF THE INVENTION

1. Field of the Invention

The present invention relates to a bolt which has a head which is not configured for receiving a conventional wrench and which does not have an axial receiving hole for receiving a screwdriver or Allen wrench so as to give the appearance that the bolt is riveted to the material to which it is attached. While embodiments of the invention is discussed below with respect to a system for mounting a motorcycle sissy bar, it will be appreciated that the present invention can be used in a wide variety of applications, including carrying loads and simple cosmetics.

2. State of the Art

Most Harley Davidson motorcycles have seats which lack backrests. While the seat will generally accommodate more than one person, the second rider often feels more secure if there is a backrest which the rider can hang onto when cornering and which will prevent him or her from falling off the back of the motorcycle if the motorcycle suddenly accelerates. Such backrests are commonly referred to as "sissy bars."

As the common terminology suggests, many people do not like to have "sissy bars" mounted on their motorcycles. This is both due to the negative stereotype and the fact that the backrest often looks out of place on the motorcycle.

Most available backrests, however, are bolted onto the rear fender bar of the motorcycle. These backrests can take considerable time and effort to remove and reinstall. Thus, many people who utilize such back rests will leave the back rests on the motorcycle for prolonged periods of time. This is so even though the rider of the motorcycle often would prefer not to have the backrest visible when a passenger is not riding on the motorcycle.

Because such back rests are beneficial and there is the desire of many riders not to have them attached for long periods of time, the industry has produced backrests which can be removed without removing the mounting bolts. For example, U.S. Pat. No. 4,993,731 shows a backrest which may be attached to the motorcycle and locked into place when in use. When not in use, the backrest can be relatively quickly detached and removed from the motorcycle.

One common disadvantage with currently available removable back rests is that they have an appearance which many find to be unappealing, including knobs or bolts which stick out from the rear fender bar of the motorcycle. Additionally, in some embodiments, when the back rest is removed from the motorcycle, the hardware which the back rest attaches to is left on the motorcycle providing a look which many find objectionable. Additionally, many removable back rests do not securely engage the motorcycle and tend to rattle when the motorcycle is idling or being operated.

Finally, a common problem with many quick release back rests is that they can take considerable effort to remove from the motorcycle despite being "quick release." They may require a key or other tool, or otherwise be difficult to use.

Thus, there is a need for an improved quick release system for motorcycle backrests. Such a quick release system for motorcycle backrest should be able to be mounted to the motorcycle quickly and with minimal effort on the part of the user. Such a quick release system for motorcycle backrests should also be secured on the motorcycle while in use. Additionally, such a system should be able to be removed from the motorcycle quickly and with little effort. Finally, the hardware used to attach the quick release system for motorcycle backrests should be configured so that the motorcycle looks as close as possible to the original equipment when the rider occasionally uses a detachable backrest is not readily apparent.

In the process of finding a better mechanism for mounting a motorcycle backrest, it has also been discovered that an improved bolt could be designed which provides an improved appearance over many bolt head, and which can be used to give the appearance of a rivet, instead of a bolt.

OBJECTS AND SUMMARY OF THE INVENTION

It a principle object of the present invention to provide an improved bolt.

In accordance with one aspect of the invention, it is an object of the present invention to provide an improved quick release system for motorcycle backrests.

In accordance with another aspect of the invention, it is an object of the invention to provide a bolt which does not provide the appearance of a bolt, but rather appears to be riveted or otherwise attached to surface that is engaged by the head of the bolt.

The above and other objects of the invention are accomplished by a bolt which is not configured for receiving a conventional wrench (i.e. lacks a hexagonal arrangement of flat surfaces) and which lacks an axially aligned opening configured to receive and engage a screw-driver or Allen wrench. Such a bolt can be used in a quick release system for motorcycle backrests, or in a variety of other applications.

When used as part of a system for mounting motorcycle back rests, the bolt is typically used with a pair of mounting bracket plates, each of which has a channel formed therein for receiving the posts of a back rest and a pair of notches formed therein for engaging bolts on the rear fender bar of a motorcycle.

In accordance with one aspect of the present invention, the first notch extends horizontally into the side bracket plate from the proximal end of the plate, and a second notch which extends upward vertically from the bottom of the plate. The positioning of the notches allows the side bracket plates to be quickly disposed on and removed from the rear fender bar of the motorcycle with a single motion by engagement of a bolt formed in accordance with one embodiment of the present invention.

In accordance with another aspect of the present invention, as related to motorcycle backrests, a retaining pin in a loaded piston is positioned adjacent to one of the notches. As the notches are moved to engage the bolts on the motorcycle, the pin extends partially across the opening of one of the notches to hold a bolt head attached to the rear fender bar within the notch and thereby inhibit removal of the side plate from the bolt.

In accordance with another aspect of the present invention regarding motorcycles, the pin is attached to a locking mechanism which selectively prevents movement of the retaining pin and thereby prevents the bolt head from being accidentally withdrawn from the notch of the side bracket plate.

In accordance with another aspect of the present invention, the bolt head is configured to receive the side plate, has a channel for receiving the notch which is positioned immediately behind the head of the bolt. The head of the bolt is configured to appear substantially like a rivot, thereby giving the appearance that a rivet has been used rather than a conventional bolt.

In accordance with still yet another aspect of the invention, the transverse recess is used for securing the head of the bolt while it is being tightened so that a recess in axial alignment with the longitudinal axis of the shank of the bolt can be configured to receive a mounting structure, such as a military pin.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. It is also to be understood that each embodiment may not accomplish each object of the invention, but provides one of more advantages over the prior art.

Figure 1:
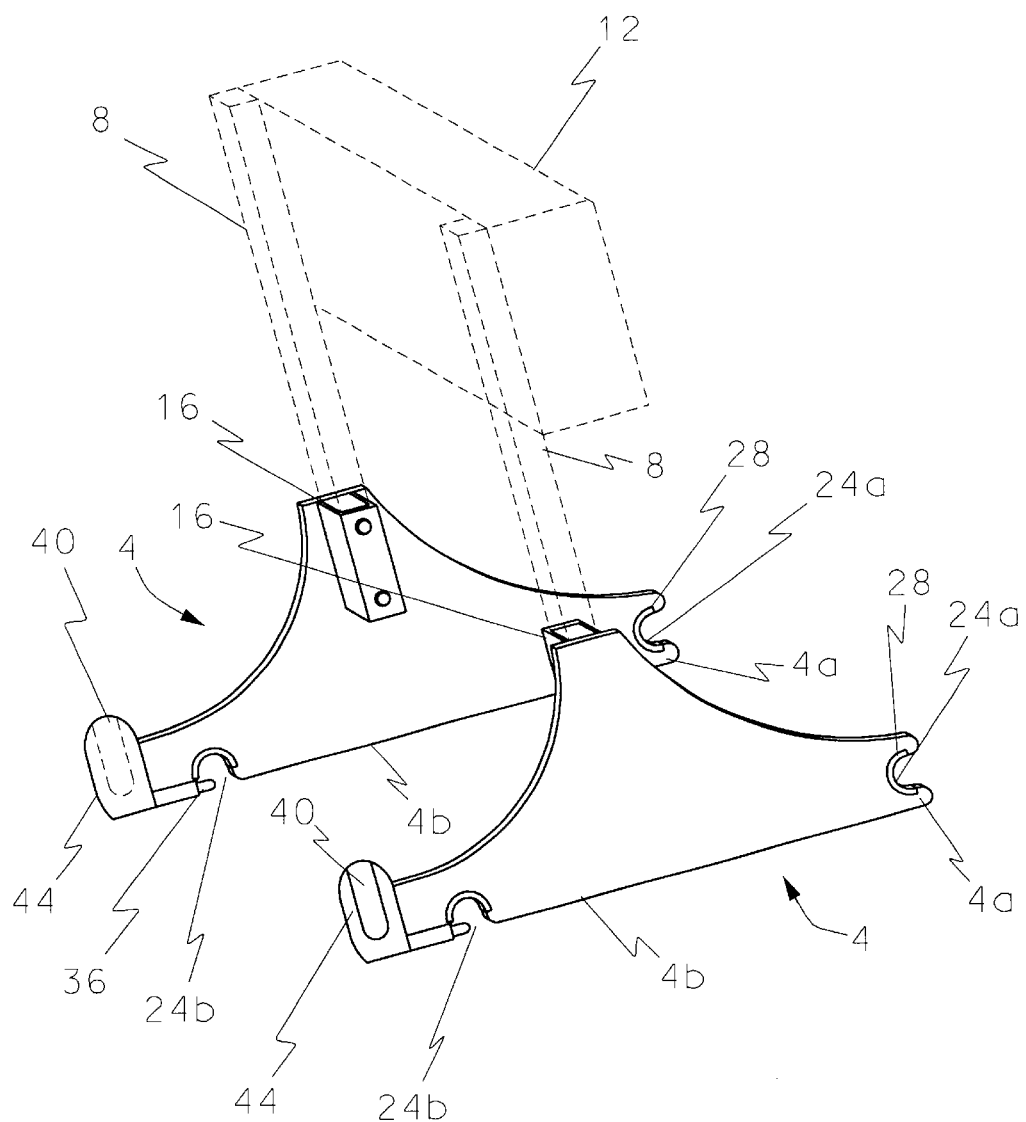
FIG. 1 shows a perspective view of a pair of side bracket plates for connecting a backrest to a motorcycle which are formed in accordance with the principles of the present invention.

Referring to FIG. 1, there is shown a perspective view of a pair of side bracket plates, generally indicated at 4 which form a quick release backrest system formed in accordance with the principles of the present invention. The backrest includes a pair of uprights 8, and a back support 12, positioned at one end of the uprights.

The opposing ends of the uprights 8, are nested in a channel 16, formed in the side bracket plates 4. Side bracket plates 4 have a pair of notches 24(a) and 24(b) which are used to secure the side bracket plates 4 to the rear fender bar (not shown in FIG. 1) of a motorcycle.

A forward notch 24a is disposed in the front end 4a of the side bracket plate 4 so that it extends into the side bracket plate generally horizontally. The second, rearward notch 24b is positioned in the side plate extending generally vertically and upwardly from the bottom 4b of the side bracket plate 4. For reasons which will be discussed in additional detail below, it is advantageous to have one notch extending into the side bracket plates 4 horizontally and the other generally vertically. While FIG. 1 shows the forward notch 24a extending horizontally into the side bracket plate 4, and the rear notch 24b extending vertically into the side bracket plate, the two could be reversed if desired.

Preferably, the front notch 24a has a semi-circular grommet 28 disposed therein. As will be explained more fully below, to attach the side plate to the motorcycle, the forward notch 24a, is slid into engagement with a generally annular channel in a bolt which is anchored in the rear fender bar of the motorcycle. The grommet 28 is configured to fit between the bolt head and the side bracket plate and significantly reduces rattling caused by vibration of the motorcycle.

Once the forward notch 24a has engaged the bolt head, the side bracket plate 4 is rotated downwardly until the rearward second notch 24b slides into engagement with an annular channel in a second bolt disposed rearwardly on the rear fender bar of the motorcycle from the first bolt. As with the first bolt, the second bolt's an annular channel is preferably sized to snuggly receive a semi-circular grommet 32 nested in the channel 24b.

Disposed adjacent the notch is a retaining means in the form of a pin 36. Attached to the pin 36 is a handle 40. The handle 40 may include a channel 44 to facilitate easy grasping between the user's thumb and forefinger. The handle 40 also preferably includes a slot on the forward side 40a so that the end of the rear end of the side bracket plate 4 remains in the handle. This prevents the user from catching a finger or clothing between the handle 40 and the rear end of the side bracket plate 4.

Figure 1A:
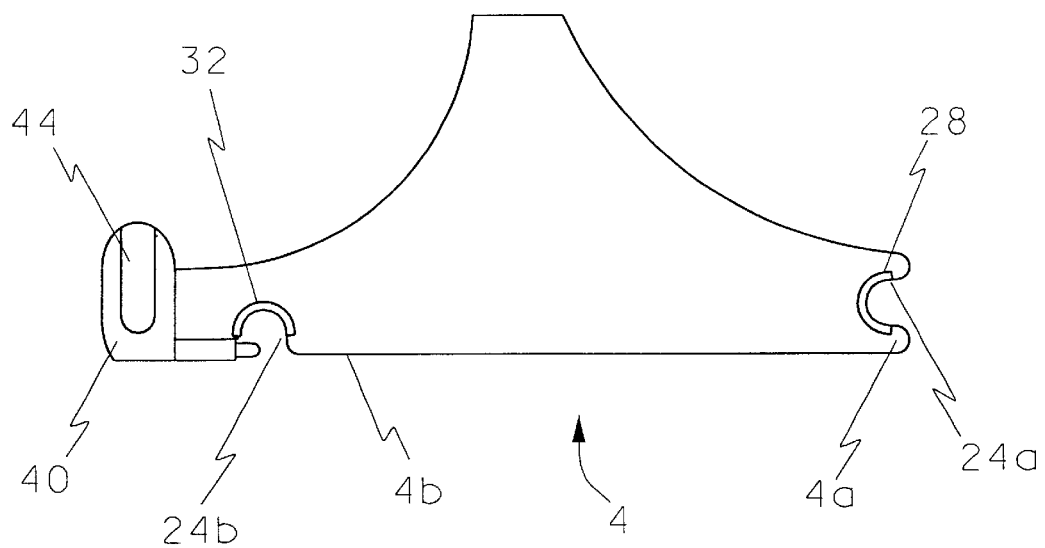
FIG. 1A shows a side view of one of the side bracket plate shown in FIG. 1, with the retaining pin withdrawn into a second position to allow mounting of the side bracket plate on a motorcycle.

By pulling rearwardly on the handle 40, the pin 36 can be moved from a first position, wherein the pin 36 obstructs the opening 24b' of the notch 24b (shown in FIG. 1), and a second position (shown in FIG. 1A), wherein the pin has been moved away from the opening of the notch.

Figure 1B:
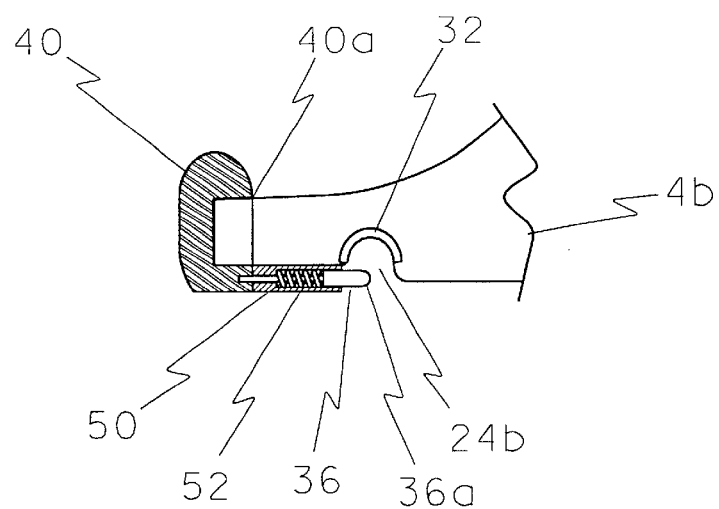
FIG. 1B shows a close-up, cross-sectional view of the rear portion of the side bracket plate shown in FIGS. 1 and 1A.

To place the head of the bolt in the notch 24b, the pin 36 is moved out of the way of the opening. As shown in FIG. 1B, this is typically accomplished by spring loading the pin 36. The spring 50 is disposed in a channel 52 which also carries the pin 36, and is used to bias the pin 36 into the first, closed position. As soon as the user releases the handle 40, the spring 50 forces the handle 40 and pin 36 to return to the original position, and the notch 24b is retained about the bolt. With the pin 36 preventing movement of the bolt head from the notch 24b, the bolt in the first notch 24a cannot be removed. Thus, the side bracket plates 4 are held to the motorcycle.

In accordance with one aspect of the invention, the pin 36 may be positioned so that it covers approximately one-half the opening when in the first position and is rounded on the end 36a. In such an orientation, the pin 36 will automatically slide out of the way as it engages the bolt. This is due both to the position of the pin 36, and the engagement between the rounded end of the pin 36 and the rounded head of the bolt. This can be further facilitated by sloping the sides of the opening 24b' of the notch 24b as shown in FIG. 1B.

Once the pin 36 has been advanced beyond the center of the bolt head, the pin 36 slides back into the first position and prevents accidental removal of the side bracket plates from the motorcycle's rear fender bar.

Those familiar with the quick release mechanisms of the prior art will appreciate that the quick release mechanism of the present invention consumes far lesser time and is easier to use both in attachment and replacement. To remove the side plate from the frame of the motorcycle, the user need only pull rearwardly on the handle 40 a sufficient distance to move the spring loaded pin 36 a sufficient distance that the bolt head will slide by the pin. The side bracket plate 4 can then be rotated upwardly and the bolt removed from the rear notch 24b. The side bracket plates 4 are then pulled rearwardly and the entire sissy bar can be removed from the motorcycle.

Those skilled in the art will appreciate that the functioning of the retaining mechanism, including the handle 40 and the spring loaded pin 36, can be affected by the length of the spring loaded piston. For example, if the spring loaded pin extends only about half way across the notch 24b, the side plate can be made to engage the motorcycle without the necessity of pulling the handle 40 rearwardly as mentioned above. Such a configuration is extremely easy to put on as only end is necessary because the handle 40 on each side need not be pulled back. However, such an engagement increases the perception that the spring loaded piston may engage the bottom side of the bolt during sudden braking situations and cause the spring loaded piston to retract and allow the side plate to release engagement from the bolt. By using a longer pin 36, or a pin which is beveled on the lower side, the risk of such accidental release can be eliminated. However, a longer pin 36 will generally require that the user use both hands to pull back the handles 40 and withdraw the spring loaded pin.

Figure 2:
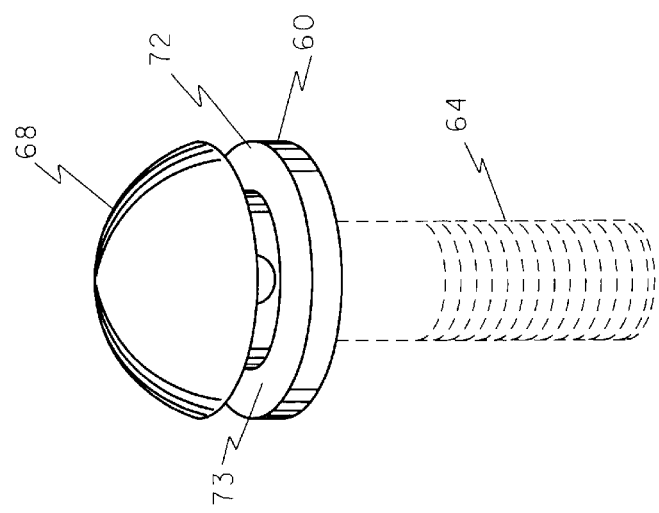
FIG. 2 shows a perspective view of a bolt which is configured to receive a side bracket plate and to secure the side bracket plate to the rear fender bar of a motorcycle.
Figure 2A:
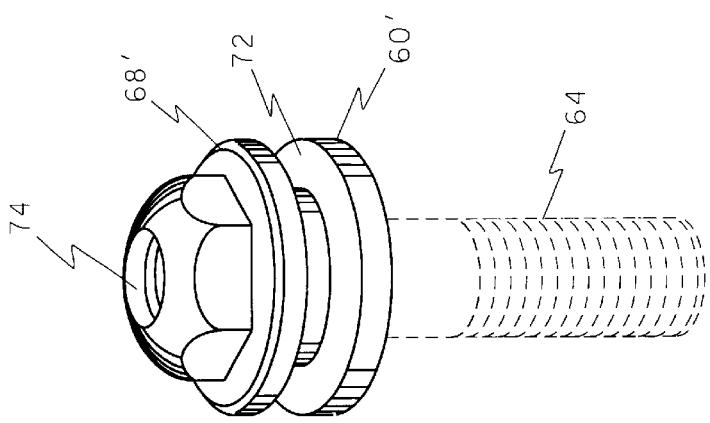
FIG. 2A shows a perspective view of an alternate embodiment of a bolt which is configured to receive a side bracket plate and to secure the side bracket plate to the rear fender bar of a motorcycle.
Figure 2B:
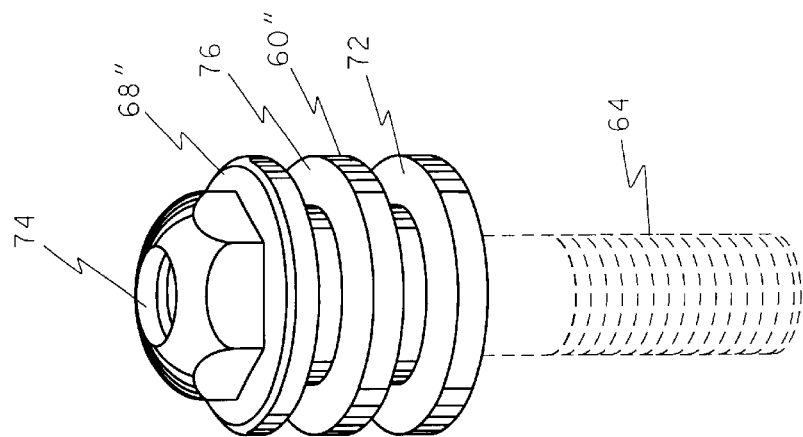
FIG. 2B shows a perspective view of another embodiment of a bolt which is configured to receive a side bracket plate and to secure the side bracket plate to the rear fender bar of a motorcycle.

Turning now to FIGS. 2, 2A and 2B, there are shown perspective views of three embodiments of a bolt 60, 60' and 60" which can be used in accordance with the principles of the present invention. Each bolt 60, 60' and 60" has a threaded shaft 64 for engaging the rear fender bar. The shaft 64 is shown in shadow on each bolt 64 to more clearly emphasize the portion of the bolt which is visible when mounted on the rear fender bar of the motorcycle.

Disposed at an end of the shaft 64 opposite the threads is a head 68, 68' and 68'. The heads 68, 68' and 68' are configured to appear similar to rounded bolt heads which are typically present on the rear fender bars of motorcycles. Unlike the conventional bolt, however, the bolt 60, 60' and 60" has at least one annular channel 72 which is configured to receive the portion of the side bracket plate 4 define the notch 24a or 24b and the associated grommet 28 or 32.

While the annular channel 72 is sufficient to allow attachment of the side bracket plates 4, they are sufficiently thin that they appear substantially the same as the bolts which are original equipment on the rear fender bar of the motorcycle.

Thus, once the side bracket plates 4 are removed from the bolts, there is virtually no indication that a sissy bar is being used on the motorcycle. Even when the side plate is on the motorcycle, the amount added to the profile of the motorcycle is very minimal and more aesthetically pleasing.

The bolt 60 in FIG. 2 also has a small hole or recess 73 for receiving a wrench, or other lever, to tighten the bolt on the rear fender bar. Additionally, the bolts 60, 60' and 60" can be used to mount other structures, such as saddle bags. Thus, bolt 60' also enclosed a female threaded portion 74 for receiving another bolt. Bolt 60" includes the female threaded portion 74, and further includes a second annular channel 76 which can be used for mounting saddle bags at the same time as the side bracket plates 4.

Figure 2C:
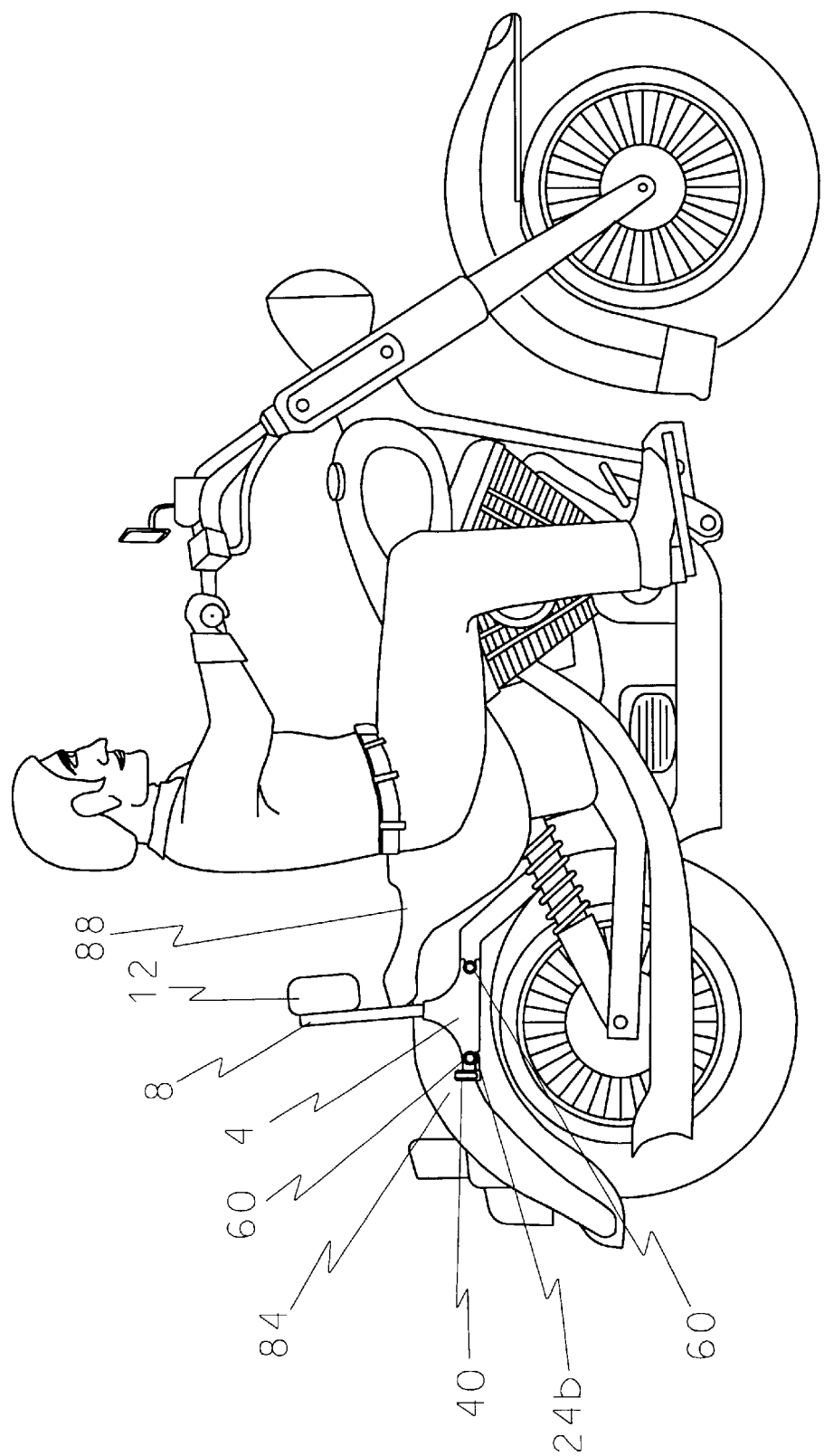
FIG. 2C shows a side view of a motorcycle having a back rest and side bracket plates mounted thereon in accordance with the present invention.

Turning now to FIG. 2C, there is shown a side view of a motorcycle 80 with a quick release backrest system attached thereto in accordance with the principles of the present invention. The side bracket plates 4 are mounted onto the bolts 60 which are anchored in the rear fender bar 84. With the side bracket plates 4 securely mounted to the rear fender bar, the backrest 12 is held behind the second seat 88 with sufficient rigidity that a person riding on the second set can lean against or hold onto the backrest.

Figure 2D:
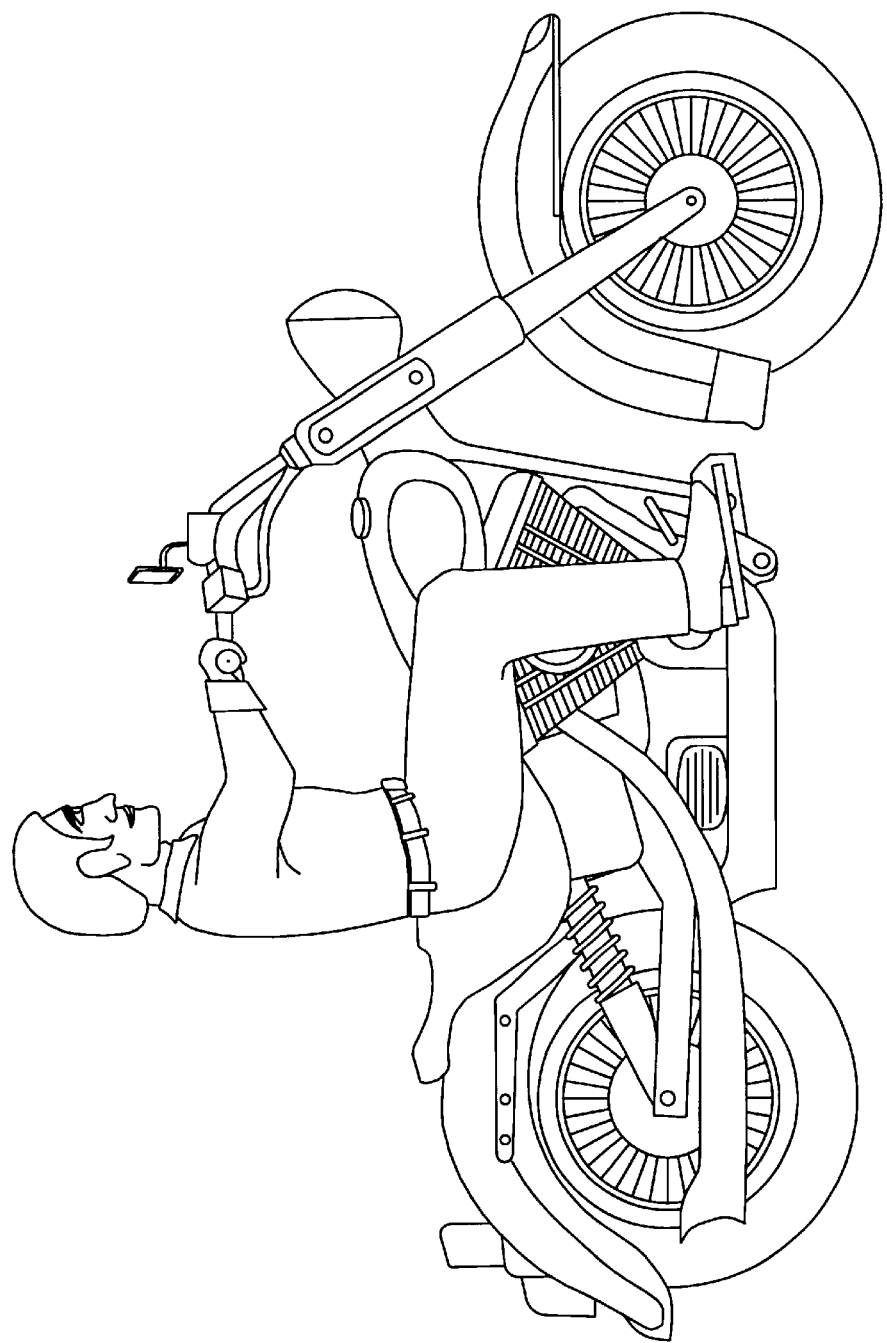
FIG. 2D shows a side view of the motorcycle of FIG. 2B with the side bracket plates removed.

To remove the backrest 12, the user need merely pull rearwardly on the handle 40 on each side, and then rotate the side bracket plate 4 upwardly until the bolt 60 is no longer in the notch 24b. The backrest 12 and side bracket plates 4 can then be stored until they are needed again. With the "sissy bar" removed, the motorcycle looks substantially identical to a motorcycle which has never used a sissy bar, as shown in FIG. 2D. To see the annular channels in the bolts 60, one must be very close. Even if the annular channels can be seen, however, it does not significantly change the appearance of the motorcycle.

Figure 3:
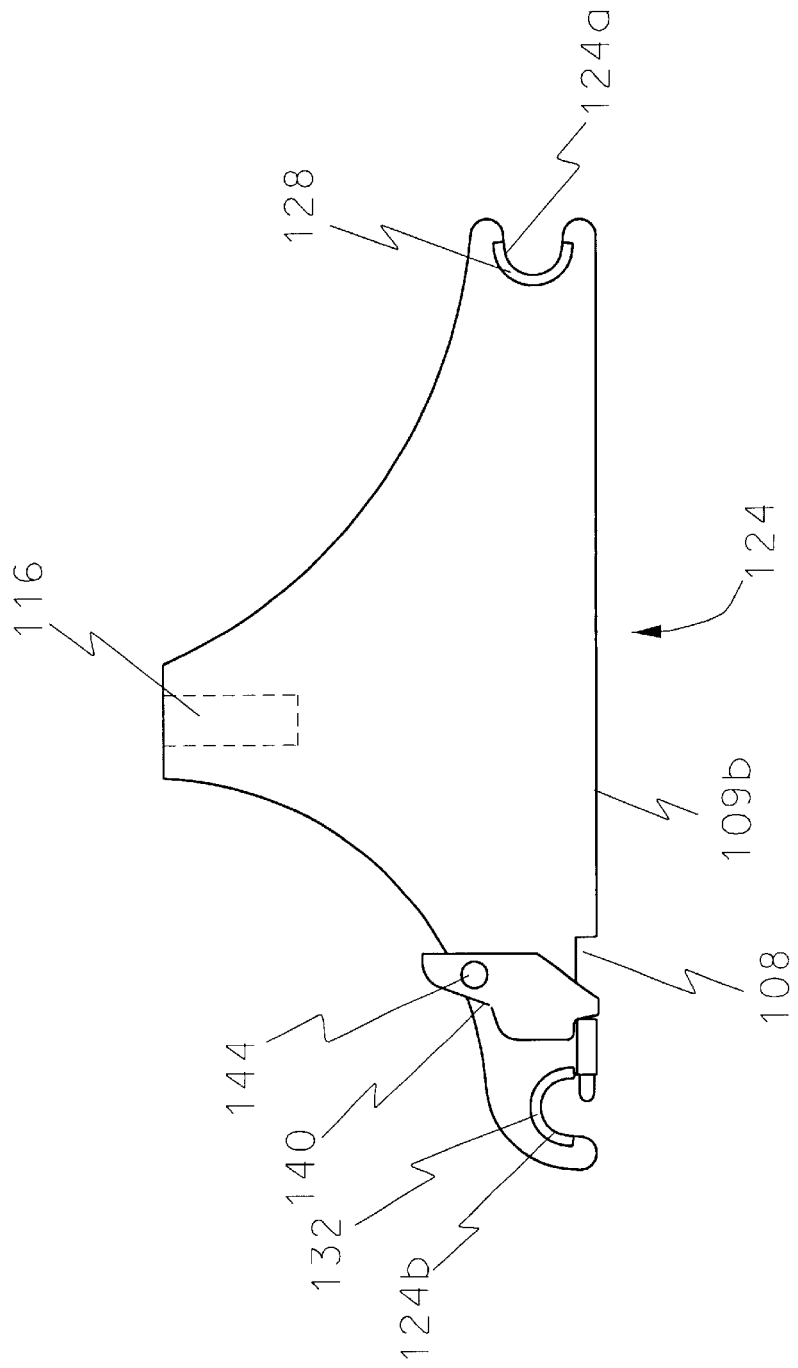
FIG. 3 shows a side view of a side bracket plate made in accordance with an alternate embodiment of the present invention.

Turning now to FIG. 3, there is shown a side view of another embodiment of a side bracket plate, generally indicated at 104, made in accordance with the principles of the present invention. The side bracket pate 104 has a first, forward notch 124a and a second, rearward notch 124b which are configured to receive bolts on a rear fender bar of a motorcycle as discussed with the prior embodiment. Each notch 124b also preferably has a grommet 28 and 32, respectively, for minimizing vibration.

Disposed adjacent the second, rear notch 124b is a slidable pin 136 which selectively prevents a bolt head from being advanced into or removed from the notch. The slidable pin 136 is attached to a handle 140 which slides along the rear portion of the side bracket plate 104. As shown in FIG.

3, the side bracket plate 104 may have a channel 108 in the bottom side 104b to facilitate sliding of the handle 140. The Handle 140 and slidable pin 136 are preferably spring loaded so that the pin is biased into a first, closed position.

Disposed on the handle is a knob 144 which is attached to a locking pin (not shown in FIG. 3). As will be explained in additional detail with respect to FIGS. 3A and 3B, the locking pin prevents accidental movement of the handle 140 and thereby prevents the side bracket plate 104 from being accidentally removed from the bolt heads.

Figure 3A:
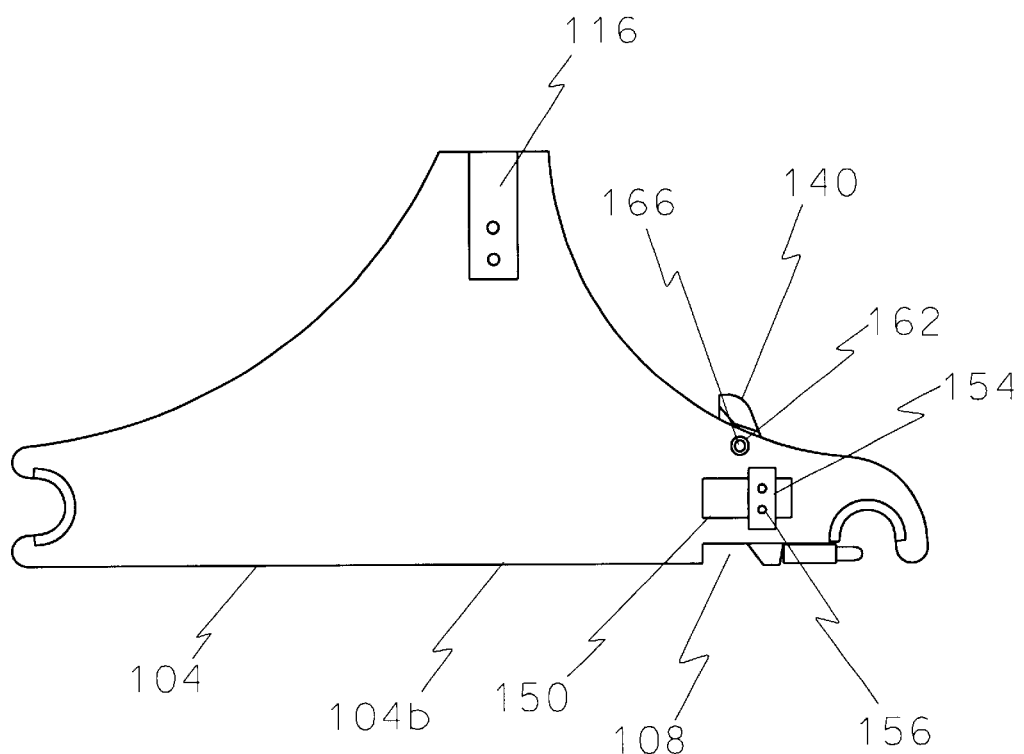
FIG. 3A shows a side view of the opposing side of the side bracket plate shown in FIG. 3.

Turning to FIG. 3A, there is shown a side view of the opposing side of the side bracket plate 104 from that shown in FIG. 3. The inner side 104c of the side bracket plate 1044 has the channel 116 for receiving the uprights (not shown)

Adjacent the rear notch 124b and channel 108 in the bottom 104b of the side bracket plate 104 is a guide channel 150 formed in the side bracket plate. A slide 154 is typically attached to the handle 140 by one or more fasteners 156 which extend through the guide channel 150. The guide channel 150 allows the handle to slide along the rear portion of the side bracket plate 104 to slide the pin 136 between the first, closed position, and the second, open position, wherein the bolt head can be moved into and out of the notch 124b.

Those skilled in the art will appreciate numerous modifications which could be made to the handle and related mechanisms. For example, the same functionality could be provided by having the handle extend over both sides of the plate.

Positioned adjacent to the guide channel 150 is a locking hole 162. The locking hole 162 is configured to receive a locking pin 166 which is attached to the knob 144 in FIG. 3. Preferably the locking pin 166 is spring loaded so that when it is positioned over the locking hole 160, the locking pin 166 will advance into the hole.

When the locking pin 166 is positioned in the locking hole 160, the handle 140 is unable to move along the rear portion of the side bracket plate 104 and the retaining pin 136 is held in the first, closed position. To move the handle 140, the knob 144 need only be pulled away from the side bracket plate 104 to move the locking pin 166 out of the locking hole 160.

Figure 3B:
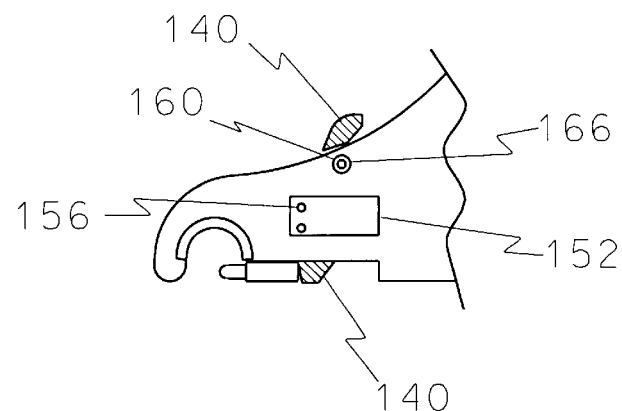
FIG. 3B shows a cross-sectional view of the rear portion of the embodiment shown in FIGS. 3 and 3A.

Turning now to FIG. 3B, there is shown a cross-sectional view of the handle 140, locking pin 166 and fastener 156 taken along the plane of the side bracket plate 104. Once the locking pin 166 is moved out of the locking hole 160, the movement of the handle 140 is limited by either the fasteners in the guide channel 152, the end of the channel 108, or the configuration of the pin 136. If the pin 136 is spring loaded, the releasing the handle 140 will return the configuration to a locking position as shown in FIGS. 3A and 3B. Those skilled in the art will appreciate that a spring could be placed along the guide channel 152 or the channel 108 in leu of having the pin 136 spring loaded directly.

Figure 4:
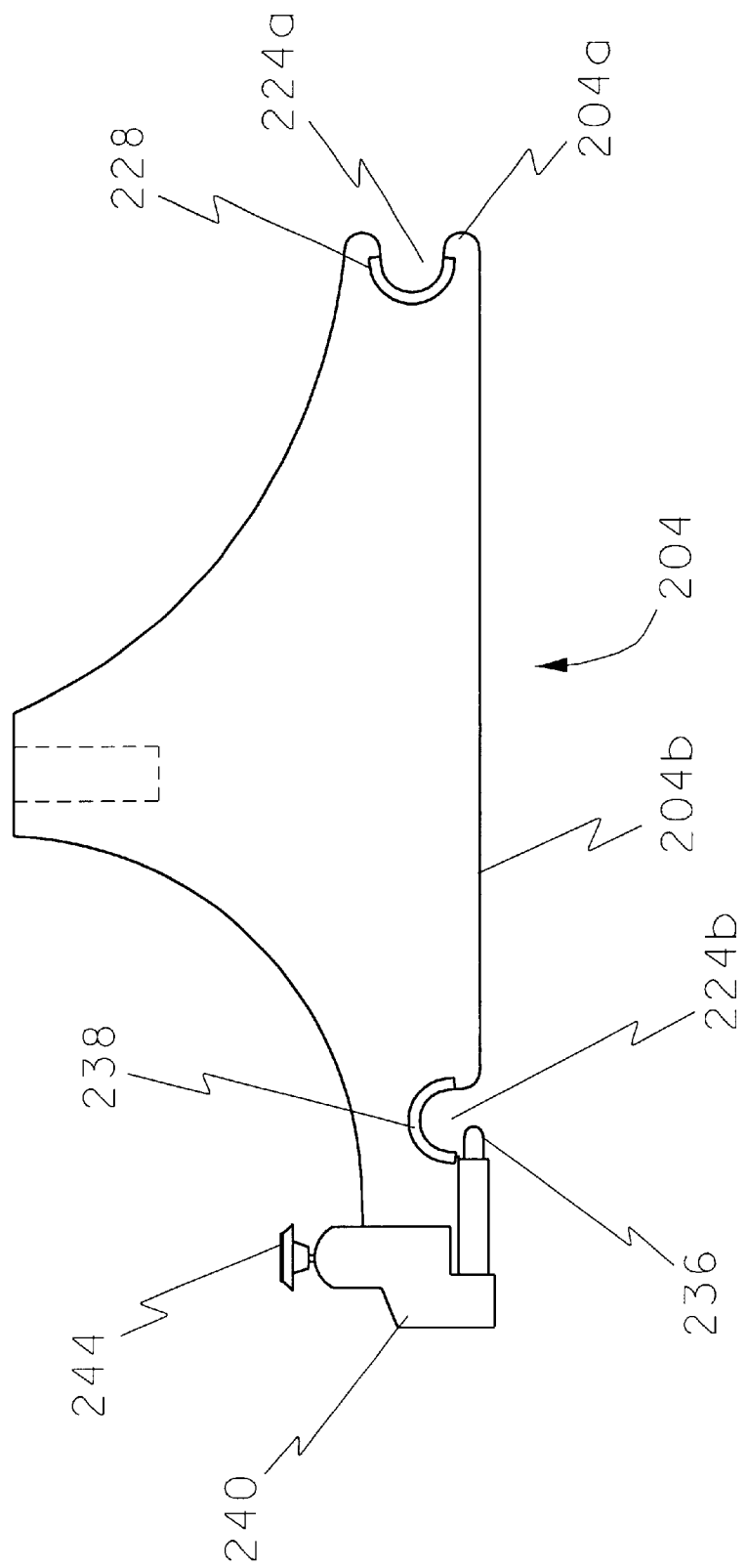
FIG. 4 shows a side view of yet another embodiment of the present invention.

Turning now to FIG. 4, there is shown a side view of yet another embodiment of a side bracket plate, generally indicated at 204, made in accordance with the principles of the present invention. The side plate includes a channel 216 for receiving the uprights of a backrest similar to the embodiments previously discussed. The side bracket plate 204 also includes a first, forward notch 224a which extends inwardly generally horizontally from the front end 204a of the side bracket plate, and a second, rear notch 224b which extends upwardly in a vertical orientation from the bottom 204b near the rear end of the side bracket plate. The rear notch 224b is preferably beveled to facilitate entry of a bolt head into the notch. Additionally, each notch 224 preferably has a semi-circular grommet, 228 and 232 respectively, for nesting between the wall defining the notch 224 and the bolt head.

The opening to the rear notch 224b is selectively occluded, or functionally closed, by a pin 236 mounted in a cylinder 238 on the bottom 204b of the side bracket plate 204. As with the other embodiments, the pin 236 is actuated by moving a handle 240 and is preferably spring loaded to return the pin to the closed position.

As shown in FIG. 4, the handle 240 has a knob 244 disposed thereon. As will be explained in additional detail in FIG. 4A, pulling the knob 244 upwardly allows the handle 240 to move away from the notch 224b and thereby move the pin 236 into a second, open position wherein a bolt head can be slid into or out of the notch. Thus the knob 244 forms part of a locking mechanism which prevents accidental removal of the side plate.

Figure 4A:
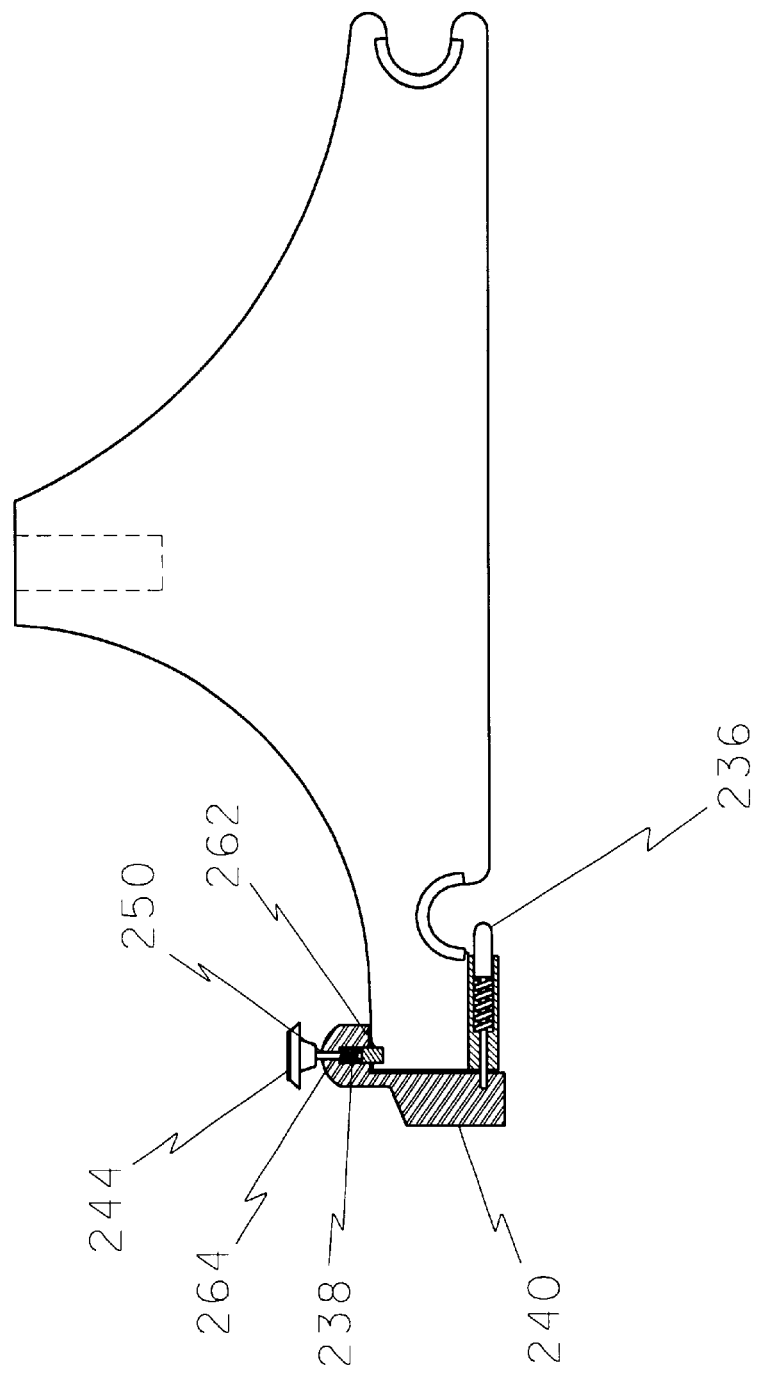
FIG. 4A shows a cross-sectional view of FIG. 4.

FIG. 4A shows a cross-sectional view of the handle 240 and associated parts. The handle 240 has a void 250 in which a locking pin 254 moves responsive to movement of the knob 244. The locking pin 254 is preferably biased downward by a spring 258 into contact with the side bracket plate 204. When the locking pin 254 is in alignment with a locking notch 262 in the side bracket plate 204 and biased downwardly, the locking pin 154 will prevent movement of the handle 240 away from the notch 224b. Thus, when the locking pin 254 is nested in the notch 262 in the side bracket plate 204, the retaining pin 236 cannot be moved.

By lifting the knob 244, the pin 254 can be moved out of the locking notch 262 and the handle moved to move the pin 236 into the second, open position. Once the handle 240 is released, the spring 238 associated with the retaining pin 236 will move the handle 240 back to its original position, allowing spring 258 to force the locking pin 254 into the locking notch 262.

Figure 5:
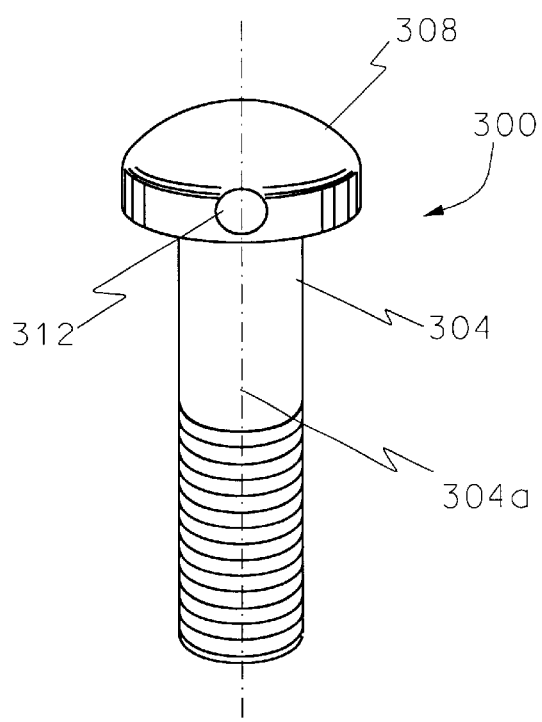
FIG. 5 shows a perspective view of another embodiment of a bolt formed in accordance with the principles of the present invention.

Turning now to FIG. 5, there is shown a perspective view of a bolt, generally indicated at 300, made in accordance with the principles of the present invention. The bolt 300 includes a threaded shank 304, with a long axis 304a and a dome-shaped head 308 disposed at one end of the shank. The dome-shaped head 308 is substantially circular about its circumference and lacking the six flat sides which is common to head bolts. The top of the dome-shaped head 308 is also solid, thereby lacking an axial recess for receiving a screwdriver or an Allen wrench. Rather, the only structure provided on the head to keep the head from rotating while a nut is being tightened along the shank 304 is a recess 312 which is disposed transverse, and preferably perpendicular to the long axis of the bolt.

As the nut is tightened, the tendency of the bolt 300 is to rotate in the direction that the nut is being rotated. By inserting a pin, Allen wrench, etc. into the transverse recess 312, a lever is formed which keeps the bolt 300 from rotating, and allows the nut to be tightened. By positioning the transverse recess 312 at the bottom of the head 308 or otherwise in the least noticeable position, the bolt head extends from structure to which the bolt is attached and provides the cleaner appearance of a rivet.

Prior to the present invention, the look of a rivet has been achieved by use of a carriage bolt. The carriage bolt typically has a head with a dome-shaped upper portion and a squared lower portion which extends downwardly to the beginning of the shank. Carriage bolts provide a much nicer look than conventional bolts. However, in order for the carriage bolt to work properly, the squared portion of the bolt head must nest in a similarly sized and shaped opening in the surface to which it is attached. If an opening in the surface is round or is not sized to match the lower portion of the head of the carriage bolt, the bolt will spin as one attempts to tighten a nut along the shank.

The present invention overcomes these disadvantages. Because the head 308 is held still, there is no need for a specialized opening in the surface to which the bolt is being attached. The opening can be round, square or some other shape, and can be larger than the portion of the bolt passing therethrough. In fact, the bolt 300 of the present invention can be used in place of a carriage bolt where the opening designed to receive the lower portion of the carriage bolt head has been stripped out and will no longer prevent the carriage bolt head from turning.

The use of the transverse hole or recess in the bolt head of the present invention also allows the use of bolt heads for which it is desirable to place some other receiving recess in alignment with the longitudinal axis of the bolt. (It will be appreciated that the hole can extend all the way through the head if desired.)

Figure 6:
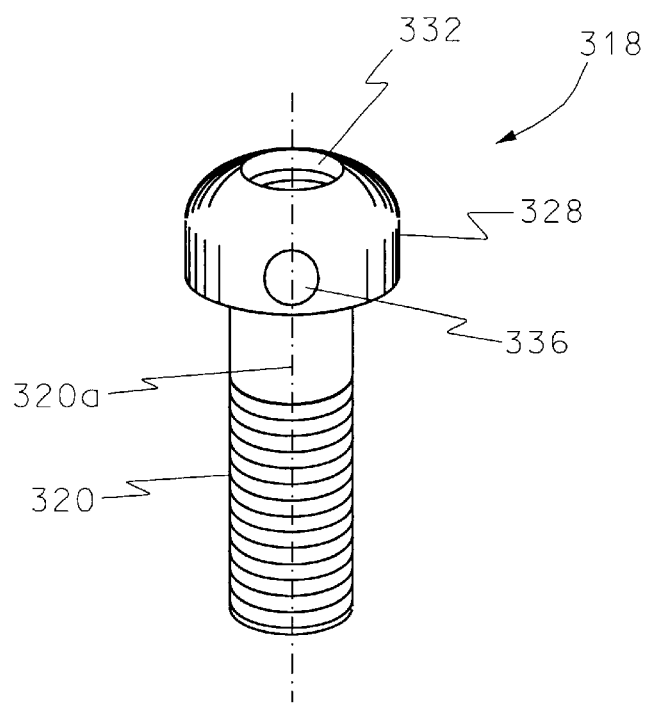
FIG. 6 shows a perspective view of yet another embodiment of a bolt formed in accordance with the principles of the present invention.

As shown in FIG. 6, a bolt 318 made in accordance with the present invention has a shank 320 and a head 328 attached thereto. The head 328 is generally rounded and gives the appearance of a rivet. However, along the longitudinal axis of the bolt 318 is a recess 332. The recess 332 allows saddle bags to be mounted on the bolts by simply inserting a military pin 334 into the recess 332. The hole 332 in the head 328 of the bolt 318 is contoured to hold the military pin 334. Typically the contour will comprise an annular groove which receives the retractable ball(s) of the military pin. A detailed description of the attachment of saddle bags in such a manner is set forth in U.S. patent application Ser. No. 10/035,599, filed Oct. 19, 2001, which is expressly incorporated herein.

Because of the location of the recess 332, it is very difficult to position a receiving recess for an Allen wrench or a screwdriver in the conventional location along the longitudinal axis of the bolt 328. By providing the transverse, preferably perpendicular recess 336, the bolt head 328 can be held in place while the nut is tightened. By positioning the recess 336 down, it is generally not noticeable, and it appears that a rivet with a receiving recess has been attached to surface, whether it be a motorcycle fender, the side of a building, etc.

Figure 7:
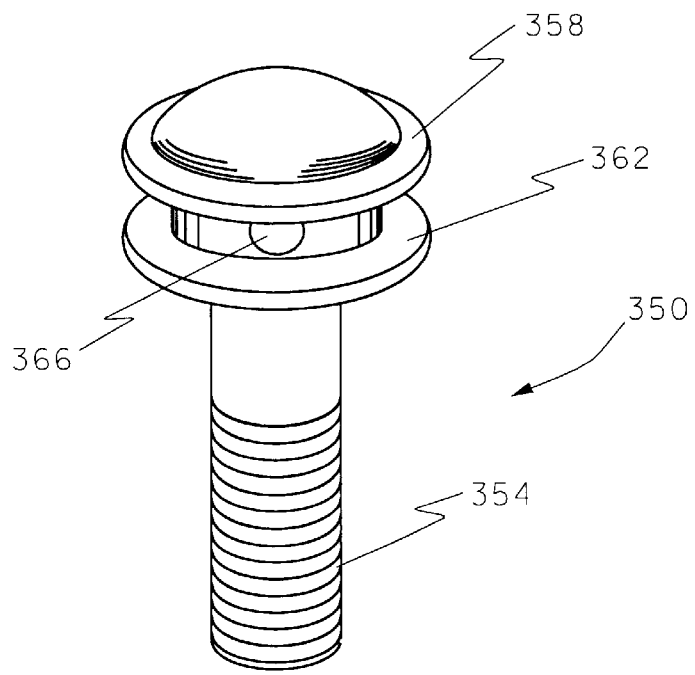
FIG. 7 shows a perspective view of yet another embodiment of a bolt formed in accordance with the principles of the present invention.

Turning now to FIG. 7, there is shown yet another embodiment of a bolt, generally indicated at 350, which can be used to mount a motorcycle sissy bar as discussed above. The bolt 350 has a shank 354 and a head 358. The head 358 includes a channel 362 which can be used from mounting a wide array of devices, including the sissy bar. Additionally, the channel 362 helps to hide the transverse recess 366 which is used to hold the head 358 while a nut is being tightened on the shank 354.

Figure 8:
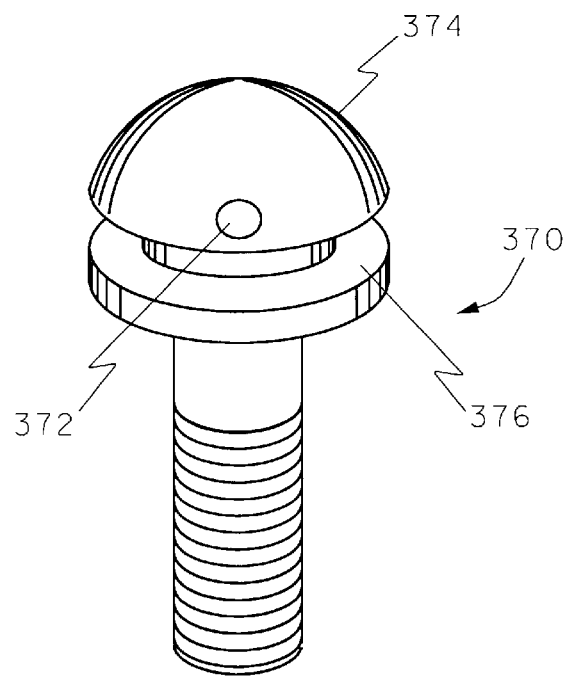
FIG. 8 shows a perspective view of yet another embodiment of a bolt formed in according with the principles of the present invention.

Turning now to FIG. 8, there is shown yet another embodiment of the present invention. The bolt 370 is substantially the same as the bolt shown in FIG. 2, except that the transverse recess 372 is formed on the dome-shaped portion of the head 374, and not in the annular channel 376.

Figure 9:
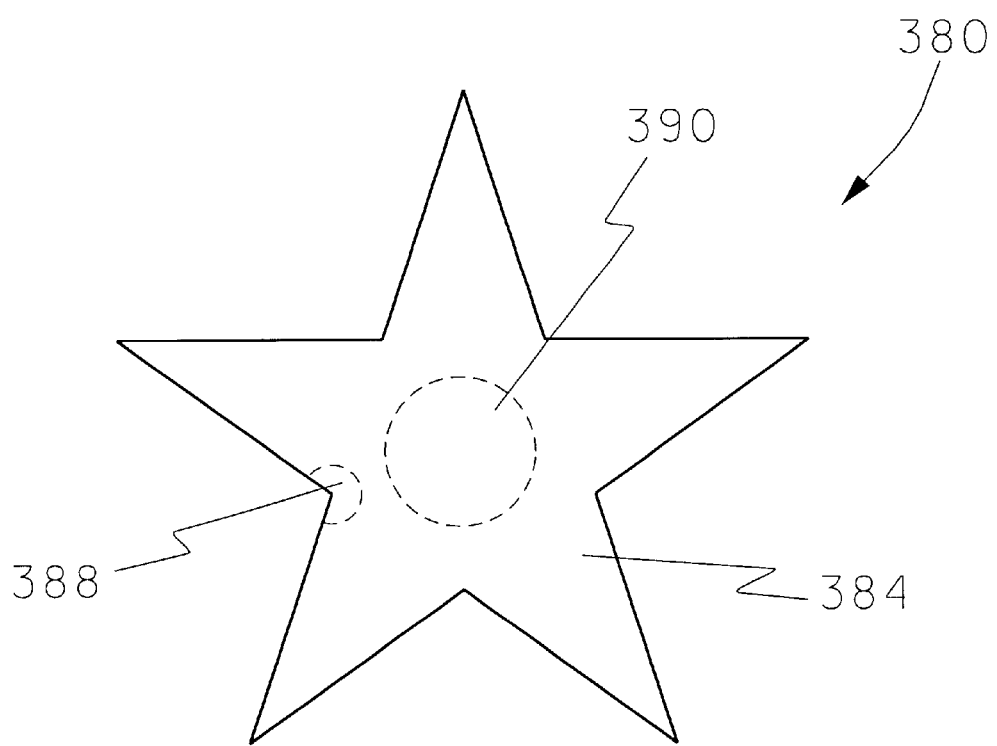
FIG. 9 shows a top view of still another embodiment of a bolt formed in accordance with the principles of the present invention.

It will be appreciated from the present disclosure that a very wide variety of head shapes can be used. For example, FIG. 9 shows a top view of a bolt 380. The head 384 of the bolt is in the shape of a star, and lacks an Allen wrench or screwdriver hole in axial alignment with the bolt 380. Rather, a transverse recess 388 is formed on the head to hold the head while the nut is being tightened on the shank, indicated at dashed lines 390.

Such a method for securing a bolt enables the use of an endless number of head designs. For example, a bolt having a head designed like an American flag could be used along a fender of a motorcycle. A bolt having the head of an animal could be placed along a wall for decoration. A bolt having a company logo could be used in place of conventional bolts on the bumper of a vehicle, or on furniture. Likewise, the fender of a motorcycle could have bolts bearing any of the Harley-Davidson logos. All of this can be done without a recess for an Allen wrench or screwdriver obscuring the design.

Thus there is disclosed an improved bolt which can be used for mounting backrests to motorcycles, or for a variety of other purposes. Those skilled in the art will appreciate numerous modifications which can be made without departing from the scope and spirit of the present invention. The appended claims are intended to cover such modifications.

What is claimed is:

1. A method for mounting a bolt on a surface, the method comprising:
    selecting a bolt having a shank having a longitudinal axis, a head having a generally solid exterior and a single transverse recess formed in the head extending inwardly from a single side thereof, the transverse recess being transverse to the longitudinal axis of the shank;
    positioning the shank of the bolt through an opening in the surface;
    positioning a lever in the single transverse recess while tightening a nut along the shank; and
    removing the lever.

2. The method according to claim 1, wherein the method comprises selecting a bolt having a head which forms a substantially continuous dome.

3. The method according to claim 1, wherein the method comprises positioning the bolt so that the recess is hidden from view.

4. The method according to claim 1, wherein the method comprises mounting the bolt on a generally vertical surface and positioning the recess at the bottom of the head.

5. The method according to claim 1, wherein the method comprises selecting a bolt having a head with an annular channel formed therein.

6. The method according to claim 5, wherein the method further comprises engaging a support structure in the annular channel so as to suspend the support structure from the bolt.

7. A method for mounting a bolt on a surface, the method comprising:
    selecting a bolt having a shank having a longitudinal axis, a head having an annular channel formed therein and at least one transverse recesses formed therein only on a single side thereof, the transverse recess being transverse to the longitudinal axis of the shank;
    positioning the shank of the bolt through an opening in the surface; and
    positioning a lever in the transverse recess while tightening a nut along the shank,
    wherein the method comprises selecting a bolt having the transverse recess disposed in the annular channel.

8. A method for mounting a bolt on a surface the method comprising:
    selecting a bolt having a shank having a longitudinal axis, a head and a transverse recess formed in the head extending inwardly from a side thereof, the transverse recess being transverse to the longitudinal axis of the shank, the bolt having a longitudinal recess disposed in axial alignment with the longitudinal axis of the shank;

positioning the shank of the bolt through an opening in the surface;

positioning a lever in the transverse recess while tightening a nut along the shank; and removing the lever.

9. The method according to claim 8, wherein the recess is configured for receiving a military pin.

10. The method according to claim 8, wherein the method comprises selecting a bolt having an annular groove extending outwardly from the longitudinal recess.

11. The method according to claim 8, further comprises nesting a military pin in the longitudinal recess.

12. A method for mounting a bolt on a surface, the method comprising:

selecting a bolt having a shank having a longitudinal axis, a head disposed at one end of the shank, the head having a circumferential surface having a solid portion and a second portion opposite the solid portion having a recess formed in the circumferential surface of the head and extending inwardly transverse to the axis of the shank, the recess extending toward but not reaching the axis of the shank;

inserting a tool into the recess to prevent rotation of head;

rotating a nut about the shank until the nut tightens the bolt in place, wherein the method comprises positioning the bolt so that only the solid portion is visible when the bolt is viewed from one side.

13. The method according to claim 12, wherein the method comprises selecting a bolt having a head which is generally solid except for the recess.

14. The method according to claim 12, wherein the method comprises selecting a bolt having a longitudinal recess formed therein for receiving a military pin.

15. The method according to claim 12, wherein the recess is a hole.

16. The method according to claim 12, wherein the method comprises mounting the bolt on a generally horizontal surface and positioning the solid portion upwardly.

17. The method according to claim 12, wherein the method further comprises selecting a bolt having a longitudinal recess.

18. The method according to claim 17, wherein the method further comprises mounting a military pin in the longitudinal recess.

* * * * *